US007013259B1

(12) United States Patent
Polanyi et al.

(10) Patent No.: US 7,013,259 B1
(45) Date of Patent: Mar. 14, 2006

(54) SYSTEM AND METHOD FOR TEACHING WRITING USING MICROANALYSIS OF TEXT

(75) Inventors: Livia Polanyi, Palo Alto, CA (US); Martin Henk Van Den Berg, Palo Alto, CA (US); Bee Yian Liew, Cupertino, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 988 days.

(21) Appl. No.: 09/609,325

(22) Filed: Jun. 30, 2000

(51) Int. Cl.
*G06F 17/27* (2006.01)
(52) U.S. Cl. .................. 704/7; 704/1; 704/4; 704/9
(58) Field of Classification Search ............... 704/1–10
See application file for complete search history.

(56) References Cited

U.S. PATENT DOCUMENTS

| | | | | | |
|---|---|---|---|---|---|
| 5,642,520 | A | * | 6/1997 | Takeshita et al. ............... | 704/3 |
| 5,963,940 | A | * | 10/1999 | Liddy et al. .................... | 707/5 |
| 6,112,168 | A | * | 8/2000 | Corston et al. ................. | 704/9 |
| 6,185,592 | B1 | * | 2/2001 | Boguraev et al. ........... | 715/531 |
| 6,205,456 | B1 | * | 3/2001 | Nakao ......................... | 715/531 |

OTHER PUBLICATIONS

Mani, *Machine Learning of Generic and User-Focused Summarization*, 1998.
Barzilay et al., *Using Lexical Chains for Text Summarization*, 1997, p. 10-17.
Polanyi et al. *A Syntactic Approach to Discourse Semantics*, 1984, p. 413-19.
Polayni et al. *On the Recursive Structure of Discourse*, 1983, p. 141-178.
Eastgate Corp. *Storyspace: A Hypertext Tool for Writers and Readers* p. 1-7 www.eastgate.com/storyspace/Stortyspace OV.html printed on Jun. 12, 2000.
Mani et al. *Multi-Document Summarization By Graph Search and Matching* 1997, p. 622-628.
Marcu *Discourse trees are good indicators of importance in text* 1999, p. 123-136.
Polanyi *The Linguistic Discourse Model: Towards a Formal Theory of Discourse Structure* Nov. 1986 152p.
Marcu *The Rhetorical Parsing of Natural Language Texts* Jul. 1997, p96-103.
Hovy et al. *Automated Text Summarization in SUMMARIST* Aug. 8, 1997.

* cited by examiner

*Primary Examiner*—David D. Knepper
*Assistant Examiner*—Qi Han
(74) *Attorney, Agent, or Firm*—Oliff & Berridge, PLC

(57) ABSTRACT

A technique for teaching expository writing using a system that provides an objective reader centric microanalysis of the information a writer has conveyed to a virtual reader. The technique uses a theory of discourse analysis such as the Linguistic Discourse Model. Using the technique, a text is segmented into discrete units of meaning of the selected theoretic model. Student analysis and understanding are facilitated by the assignment of types to the discrete units of meaning and by linking the discrete units of meaning into a discourse tree under the constraints imposed by the selected theory. A virtual, or objective, reader centric summary of the information actually conveyed by the text is then compared to the writer designated important concepts and the results conveyed as feedback to the writer.

25 Claims, 5 Drawing Sheets

COORDINATION, 1-6 (0)
- JOHN CAME IN THROUGH THE BACK DOOR (0)
- HE WALKED INTO THE KITCHEN (0)
- SUBORDINATION, 3-4 (0)
  - HE APOLOGIZED TO HIS WIFE FOR BEING LATE (0)
  - SUBORDINATION 4-5 (1)
    - HE HAD TO VISIT HIS MOTHER (1)
    - HIS MOTHER LIKES HIM TO COME BY (2)
- HIS WIFE SAID SHE DIDN'T MIND (0)

*Fig. 4*

SYSTEM AND METHOD FOR TEACHING WRITING USING MICROANALYSIS OF TEXT

BACKGROUND OF THE INVENTION

1. Field of Invention

This invention is related to machine mediated instruction and computer based learning systems.

2. Description of Related Art

Current writing analysis involves human writer review processes. These processes include an instructor or a peer reviewing a written work. These processes can also be computer enhanced by enabling the review process to take place over a computer network, via, for example, email. Alternatively, the review process can take place in computer-enhanced, collaborative-peer-review environments, in which other participants critique the written work.

These writing analysis processes suffer from a number of problems. In writing workshops, the instructor reviews the text from the perspective of the target audience. The instructor provides feedback on problematic language. The instructor often indicates a sentence is incorrect but usually does not provide a reader centric microanalysis of the text explaining precisely why the text is incorrect.

In fact, reviewers tend to focus on two levels of structure in the review. Since reviewers feel comfortable with grammar checking, the reviewers might perform grammar checking for the entire text. Less frequently, vague or ambiguous sentences may be identified. However, reviewers do not explain why a sentence is vague or ambiguous. The location of the problem is identified and the user is expected to understand how to correct the problem.

A second problem stems from the stylistic preferences of each reviewer. A reviewer's subjective style preferences will in turn affect a reviewer's critique of the written work. Thus, instead of receiving an objective indication of how well the work communicated the desired information to the reader, the reviewer may focus on subjective stylistic preferences.

Further, the sheer volume of material to be reviewed tends to force a reviewer to focus on relatively easier problems. For example, the writer's overall organization may be critiqued with only the occasional exemplary sentence construction analyzed in detail.

Outlining tools, such as the "outline view" in the Microsoft Word® word processor application, as well as Xerox Corporation's "Notecards" and EastGate Corporation's "StorySpace" tools, help the writer frame higher level concepts and issues. The writer may then concentrate on developing each of the ideas within a framework. However, these tools do not address the structure and organization of the text below the concept and topic level. Since these tools do not support analyzing how the units of meaning interrelate, they cannot be used to show the writer how to improve the text below the concept and issue level.

Grammar checking tools, such as "Grammatick II" and the grammar tool in Microsoft Word®, apply statistical formulas to a selected text to determine readability based on a variety of different formulae, such as the Flesch Reading Ease Index or the Flesch-Kincaid Grade Level index. These tools also provide sets of rules that can be applied to a written text to identify run-on sentences, sentence fragments, archaic expressions and gender-specific expressions. However, these tools merely indicate whether a text satisfies the rules. Though these tools may provide suggestions for improving a text, based on the identified rule violations, these tools do not provide a structural representation of the text. Therefore, these tools cannot show the user how to improve the relationships of meaning between the units of text.

Text analysis tools, as described in Marcu, "The Rhetorical parsing of natural language texts" Proceedings of the 35$^{th}$ Annual Meeting of the Association for Computational Linguistics and the 8$^{th}$ Conference of the European Chapter of the Association for Computational Linguistics, Madrid, July, 1997, 96–103 can provide structural representation of a text based on an analytic framework. The system described, for example, is directed to the analysis of texts for the purpose of improved discourse level automatic Natural Language processing. It is not directed to improving the structure or style of the text or to educate the writer in how to improve the organization of future prose works that might be produced.

Rhetorical Structures Theory is a highly complex theory. The basic units of analysis have never been articulated clearly and the several variations of Rhetorical Structures Theory differ from one another in the basic relations between units that they employ. The relations themselves are very complex, overlapping and ambiguous. For example, classical Rhetorical Structures Theory as developed by Mann and Thompson (1988) includes at least ten presentational relations, five multinuclear relations and fifteen subject matter relations. Training coders is a very lengthy task, requiring weeks of intensive study and supervision. Strong differences of opinion arise among experienced coders about the relationships which link units together. Intercoder reliability is very low. Depending on the level of analysis chosen by different coders, quite different structural trees labeled with Rhetorical Structures relations may be built. Therefore, different Rhetorical Structures Theory analyzers may produce significantly different structural representations from the same text. These factors taken together pose particular problems when attempting to apply Rhetorical Structures Theory in a learning environment where the goal is to help students improve their written communicative skills by applied text micro-analysis.

The Summarist system, as discussed by Hovy and Lin, "Automated Text Summarization in SUMMARIST" in Proceedings of the Workshop of Intelligent Scaleable Text Summarization, July 1997, uses statistical techniques, along with symbolic world knowledge of word meaning based on dictionaries, in attempting to discern a writer's intent. Since the Summarist system uses statistical techniques to identify important keywords, the Summarist system only produces topical keyword summaries.

Thus, these conventional natural language processing systems attempt to identify intended meaning in a text corpus. These systems do not exploit linguistic constraint information provided in the text but instead rely on statistical analysis and word frequency counts. A determination is made, from this statistical information, as to what information the author intended to convey. This information is then used to facilitate queries.

SUMMARY OF THE INVENTION

However, the conventional systems described above do not provide a reader-centric analysis of the text and fail to show the writer why the text is incorrect or to provide a basis for determining how to fix the text. Such a reader-centric microanalytic system would be a valuable tool. Instead, these conventional systems focus on the intended meaning of the writer. That is, systems and methods that allow a user to analyze a text corpus from the reader's perspective and to interactively view how changes made to the written text change the summary to more closely match the desired communicative goal of the written piece are desirable.

This invention provides writing instructions systems and methods for teaching writing skills to a student using an objective reader-centric microanalysis of the text.

This invention separately provides systems and methods that teach expository writing skills using a "virtual reader". A "virtual reader" is an objective reader that follows set rules to deterministically identify the information conveyed by a passage of text.

This invention separately provides systems and methods for designating important topical information within the text to be analyzed by highlighting or tagging the topical words or phrases.

In various exemplary embodiments, the writer segments the text into discrete units of meaning consistent with a theory of discourse analysis. The segmented text may then be analyzed by a reviewer or a reviewing system. The reviewer or the reviewing system can provide comments to the user based on the analysis. The comments can identify errors and/or suggest improvements. The writer can then revise the segmented text based on the comments.

In various exemplary embodiments, the student classifies the units of meaning by type. The classification may then be reviewed by the reviewer or reviewing system. Following this review by the reviewer or reviewing system, the writer then creates a discourse structural representation that reflects the interrelationships between the units of meaning, consistent with a selected theory of discourse. Optionally, the information designated by the user as important can be displayed in the discourse structure.

An automatically generated summary is optionally created from the discourse structural representation. The summary can then be compared to the topic information designated by the writer as important. The degree of coverage is conveyed as objective feedback to the writer as to how well the text would have conveyed the desired information to the reader. In various exemplary embodiments, the reader centric text analysis systems and methods according to this invention use the Linguistic Discourse Model, although other theories of discourse may be used in place of the Linguistic Discourse Model.

BRIEF DESCRIPTION OF THE DRAWINGS

The invention will be described with reference to the accompanying drawings, in which like elements are labeled with like numbers, and which:

FIG. 4 shows an exemplary discourse structural representation of text.

DETAILED DESCRIPTION OF EXEMPLARY EMBODIMENTS

Figure 1:
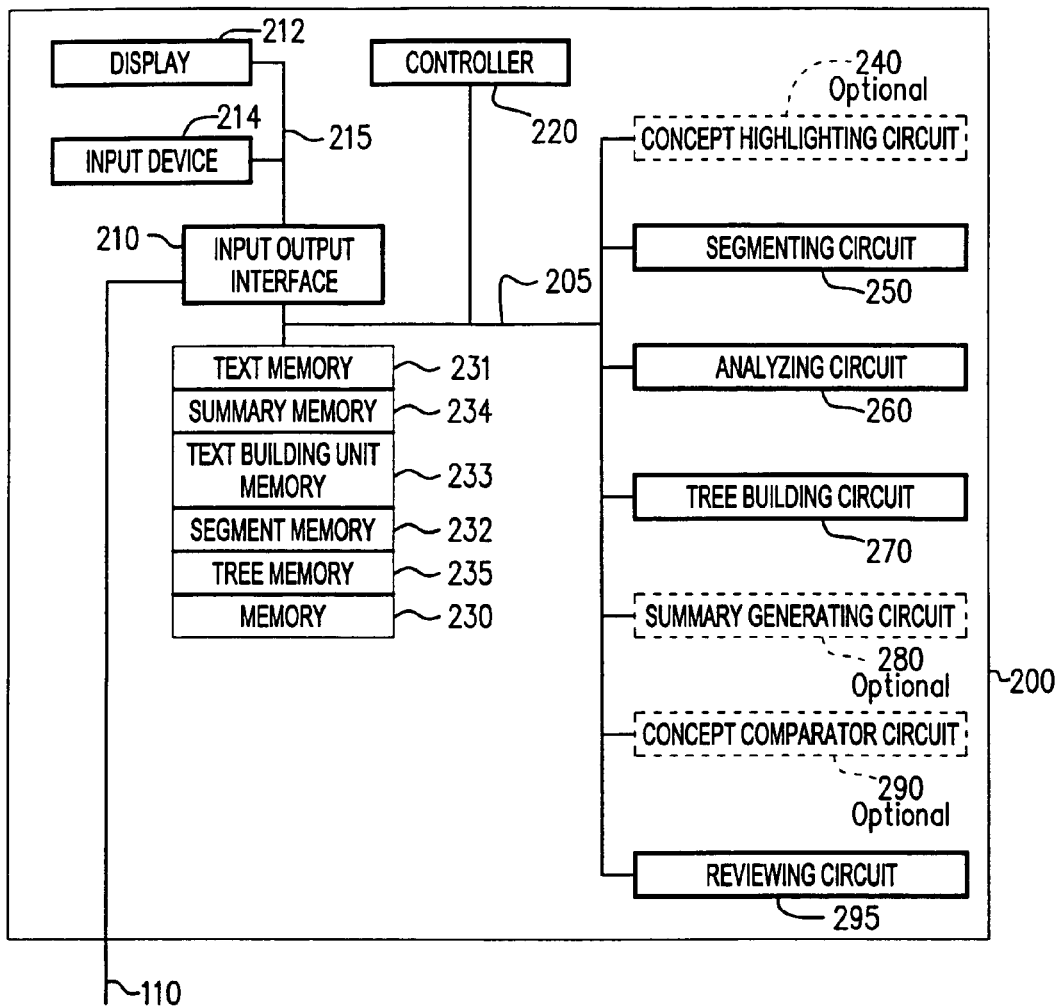
FIG. 1 shows a block diagram of an exemplary embodiment of the invention.

FIG. 1 shows an exemplary embodiment of an expository writing teaching system 200.

The expository writing teaching system 200 includes a controller 220 connected to an input/output interface 210 and a memory 230. The memory can include one or none of having a text portion 231 a segment portion 232, text building portion 233, summary portion 234 and tree portion 235. The input/output interface 210 is connected by a link 215 to one or more input devices 214 and to a display device 212. The input/output interface 210, the controller 220 and the memory 230 are connected to an optional concept highlighting circuit or routine 240, a segmenting circuit or routine 250, an analyzing circuit or routine 260, a tree building circuit or routine 270, an optional summary generating circuit or routine 280, an optional concept comparator circuit or routine 290 and a reviewing circuit or routine 295 by a data/control bus 205.

A link 110 connects the expository writing teaching system 200 to other devices or components. It will be apparent that the link 110 may also be used to permit remote access to the expository writing teaching system 200 for a user or a reviewer or reviewing system. The link 110 may be any known or later developed device or system for connecting to the expository writing teaching system 200, including a direct cable connection, a connection over a wide area network or a local area network, a connection over an intranet, a connection over the Internet, or a connection over any other distributed processing network or system. In general, the link 110 can be any known or later developed connection system or structure usable to connect a user, a reviewer or a reviewing system to the system for teaching expository writing 200.

The controller 220 stores information in the memory 230. The memory 230 may be implemented using a hard disk and disk drive storage, a floppy disk storage, a re-writable optical disk storage, bubble memory, flash memory, static and/or dynamic RAM, battery-backed RAM, or the like. The controller 220 displays information on the display 212 and accepts user input via the one or more user input devices 214. User inputs to the expository writing teaching system 200 may include one or more of voice input, keyboard input, touch sensitive screen input or any method of entering information into the expository writing teaching system 200.

The user calls up a text to be analyzed from the text memory 231. Alternatively, the user may use any word processor, text processing application or text editor to create a text file to be analyzed. In various exemplary embodiments, once the text has been obtained, whether by importing the text from an existing file in the text memory 231 or created using a text editor, the optional concept highlighting circuit or routine 240 is used to highlight concepts in the text that the user believes to be important. However, it should be appreciated that, in place of, or in addition to, highlighting, other methods for designating important concepts, such as XML tagging, typing the concepts into a pop-up dialog box, or any other known or later developed technique for identifying the important concepts, may be used. It will be appreciated that the expository writing teaching system 200 may also be used without any highlighting.

The user then segments the text into text building units by activating the segmenting circuit or routine 250. Different linguistic theories build discourse from different basic text building units. In various exemplary embodiments, the Linguistic Discourse Model is used to analyze the text and categorize the text building units. The Linguistic Discourse Model used in these exemplary embodiments provides for three distinct types of text building units. Each text building unit represents the smallest unit of meaning in the text. A sentence may have, or be formed from, a single text building unit. However, a sentence is more likely to be formed from several text building units. Using editing features of the segmenting circuit or routine 250, the user breaks up the text to be analyzed into the text building units. In various exemplary embodiments, a line break is inserted between each text building unit. This creates a list of text building units, with one text building unit on each line. However, it should be appreciated that delimiting one text building unit from another can use any known or later developed delimiting technique. The output of the segmentation circuit 250 or the user segmented text will result in the same list of text building units.

The list of text building units to be analyzed is then, under control of the controller 220, provided to the analyzing circuit or routine 260. In the analyzing circuit or routine 260, additional data fields are exposed to the user to allow the user to assign a text building unit type to each text building unit. The user may select a text building unit type for each text building unit based on the theory of discourse chosen to be used for instruction. The determined text building units are then stored in the text building units memory portion 233.

There are many theories of discourse analysis that may be employed in the writing instruction systems and methods according to this invention. Such theories include, but are not limited to the Discourse Structures Theory, the Rhetorical Structure Theory, the Systemic Functional Grammar and Tagmemics.

Various exemplary embodiments of the writing instruction systems and methods according to this invention use the Linguistic Discourse Model theory of discourse analysis. As indicated above, the Linguistic Discourse Model provides for three types of text building units: content text building units; modifier text building units; and operator text building units. Content text building units express some state, action or belief that is an accomplishment or property of some entity. Content text building units have a verb at their core, whether expressed or unexpressed. Modifier text building units provide context setting information for information encoded further along in the text. Operator text building units provide commentary on aspects of text organization or logical structure or may express emotional reaction to something in the context. Each text building unit is assigned to one of these categories.

The user may then submit the users work, i.e., the list of text building units, along with the associated text building unit type assignments, to the reviewer or the text reviewing system. The reviewer may use the controller 220, the display 212 and the one or more input devices 214. In this case, the expository writing teaching system 200 becomes the reviewing system while used by the reviewer to review the user's work. Alternatively, the reviewer or reviewing system may use a different controller connected via a network (not shown) through the input output interface 210 and link 110 to access the users work and to review the text building unit type assignments using the reviewing circuit or routine 295.

When the reviewer, using the reviewing system, views the user's work, an additional field for the reviewer's comments is presented by the reviewing circuit or routine so that the reviewer may respond to the user's comments. The reviewer then analyzes the text building unit types assigned by the user, and provides corrections and/or comments as necessary.

This review may also be performed automatically by a reviewing system that automatically recognizes and assigns a text building unit type to each text building unit. In this case, the comments can be generated based on the user's comments and the differences between the user's work and a "correct" answer. For example, if the reviewing system detects that the user has entered a comment and further detects that the corresponding text building unit has been assigned an inappropriate text building unit type, a system comment may be generated and placed in the reviewer comment field to more fully explain why the user's selection was an inappropriate selection.

After the reviewer or reviewing system has saved the work to the segment portion 232, the user may then re-open the work. The work is then processed, under control of the controller 220, by the tree building circuit or routine 270. The tree building circuit or routine 270 creates a node for the first text building unit of the text and begins by defining this node as the root node of the discourse tree. As additional fields are exposed to the user, the relation fields identify the type of constructed node used to link the text building units into the discourse tree. The node fields allows the user to select an insertion point in the discourse tree for the text building unit that is being analyzed. The text building units are added to the structural representation of the discourse consistent with the particular theory of discourse used in the expository writing teaching system 200. That is, depending on the particular theory of discourse, a particular text building unit can be added to the structural representation of discourse at different points and/or in different ways. In the Linguistic Discourse Model used in various exemplary embodiments of the expository writing teaching system 200, the structural representation is an open right tree.

In various exemplary embodiments, the Linguistic Discourse Model provides three relationships between the text building units: 1) coordinations; 2) subordinations; and 3) binaries. A coordination relationship between two text building units exists when a second text building unit continues a discourse activity that was previously begun or continued by a first text building unit. In this case, the second text building unit is linked to the discourse tree and the first text building unit with a coordination node.

In particular, in various exemplary embodiments, if the relation between the second text building unit to be added and text building unit, represented by a first node in the structural representation or tree, is a coordination relationship, the first or existing node is replaced by a new coordination node and the first node becomes a leaf node of the new coordination node. The new coordination node links the first node representing the first text building unit as a left child node of the new coordination node into the discourse tree. A second node representing the second text building unit to be added is then linked to the new coordination node as the right child node of the new coordination node. In some cases, a subsequent text building unit may extend the activity carried out by text building units already related to one another in the discourse tree as siblings under a coordination node. In this case, a third node representing a third text building unit will be added under the existing coordination node as a new right child node The second node then becomes a middle child node.

If the relation between the text building units is not a coordination relationship, the second text building unit is analyzed to determine if that text building unit elaborates upon or interrupts an active discourse in the discourse tree. A discourse is active if it has a relationship node or a text building unit that is located along the right edge of the discourse tree. If the second text building unit elaborates upon, or interrupts an active discourse, the relationship between the second text building unit and the previous text building unit is defined as a subordination relationship. In this case the first node is replaced by a new subordination node and the first node becomes a leaf node of the subordination node. The second node representing the second text building unit is linked into the discourse tree as the right child node of the new subordination node.

If none of the relationships between the second text building unit and the first text building unit forming the right edge of the discourse tree are either a coordination or a subordination, then the second text building unit is classified as having a binary relationship with the first text building unit in the discourse tree. The first or existing node is replaced by a new binary node and the first node becomes a leaf node of the binary node. The second node representing the second text building unit is then added as the right child node of the new binary node.

In the embodiment using the Linguistic Discourse Model, the user progresses through the text, and the structural representation of discourse is an open right tree. Accordingly, the nodes representing the text building units are added to the discourse tree only at the right edges of the discourse tree. As a result, the potential insertion points where the next text building unit can be added to the discourse tree can be easily determined and presented to the user. In various exemplary embodiments, the list of insertion points can be displayed to the user in the form of a constrained drop down selection box. Of course, alternate theories of discourse may utilize different structural representations of discourse.

Building the organizational structure using the rules of a discourse theory, such as the Linguistic Discourse Model, allows the user to gain a better understanding of the relationships between the text building units in the user's text. During building of the organizational tree, the user is prompted to understand how the text building units must interrelate in order to convey the desired information to a reader. This tree building process increases the user's understanding of the communicative aspects of the user's own writing. If an ambiguity exists regarding the appropriate insertion point for a text building unit, this ambiguity highlights the ambiguity the reader will experience with respect to the same unit of meaning represented by that next text building unit. Alternatively, tree building may be accomplished automatically. A discourse tree is built reflecting the organization of the text according to the discourse theory being used.

The user may then activate the summary generating circuit or routine 280. Alternatively, the summary generating circuit or routine 280 may be automatically invoked after the tree building circuit or routine 270 has completed processing. The user then selects the level of summary L to be generated. The value for the summary level L ranges from a lowest level, for example 0, representing the most specific level to a highest level P, the most general level. The value of the most general level P reflects the maximal number of subordination levels in the discourse tree. The summary generating circuit or routine 280 takes the structural representation of discourse, which in the various exemplary embodiments employing the Linguistic Discourse Model, is an open right tree generated by the tree building circuit or routine 270, as input, along with the summary level L indicated by the user. The summary generating circuit or routine 280 generates a summary of the structural representation, for the specified summary level L.

After the summary is generated by the summary generating circuit or routine 280, the optional concept comparator circuit or routine 290 may be activated. The concept comparator circuit or routine 290 may be automatically activated when the summary generating circuit or routine 280 completes processing or may be invoked by the user in a separate action. The concept comparator circuit or routine 290 operates on the output of the concept highlighting circuit or routine 240 and the summary generating circuit or routine 280. The concept comparator circuit or routine 290 compares the coverage of the information identified by the concept highlighting circuit or routine 240 to the summary generated by the summary circuit or routine 280. The concept comparator circuit or routine 290 compares the words and/or phrases output by the concept highlighting circuit or routine 240 to those words that also appear in the output of the summary circuit or routine 280.

The user may then receive a numerical ratio or a percentage, or any other suitable method or visualization, that indicates the amount of coverage the text provides to the identified word and/or phrases. The ratio indicates how many of the important words or phrases were conveyed to the virtual reader as indicated by the summary generated by the summary generating circuit or routine 280. The coverage measure may also be conveyed as feedback to the user by displaying the important concepts identified by the highlighting circuit or routine 240. The words and/or phrases output by the highlighting circuit or routine 240 but not found in the summary generated by the summary generating circuit or routine 280 are then displayed in a distinguishing color, such as red. In this way, the user's attention is immediately drawn to the problem areas in the text. Alternatively, the user may optionally view the highlighted portions of the text in a visualization of the structural representation of the discourse.

Figure 2A:
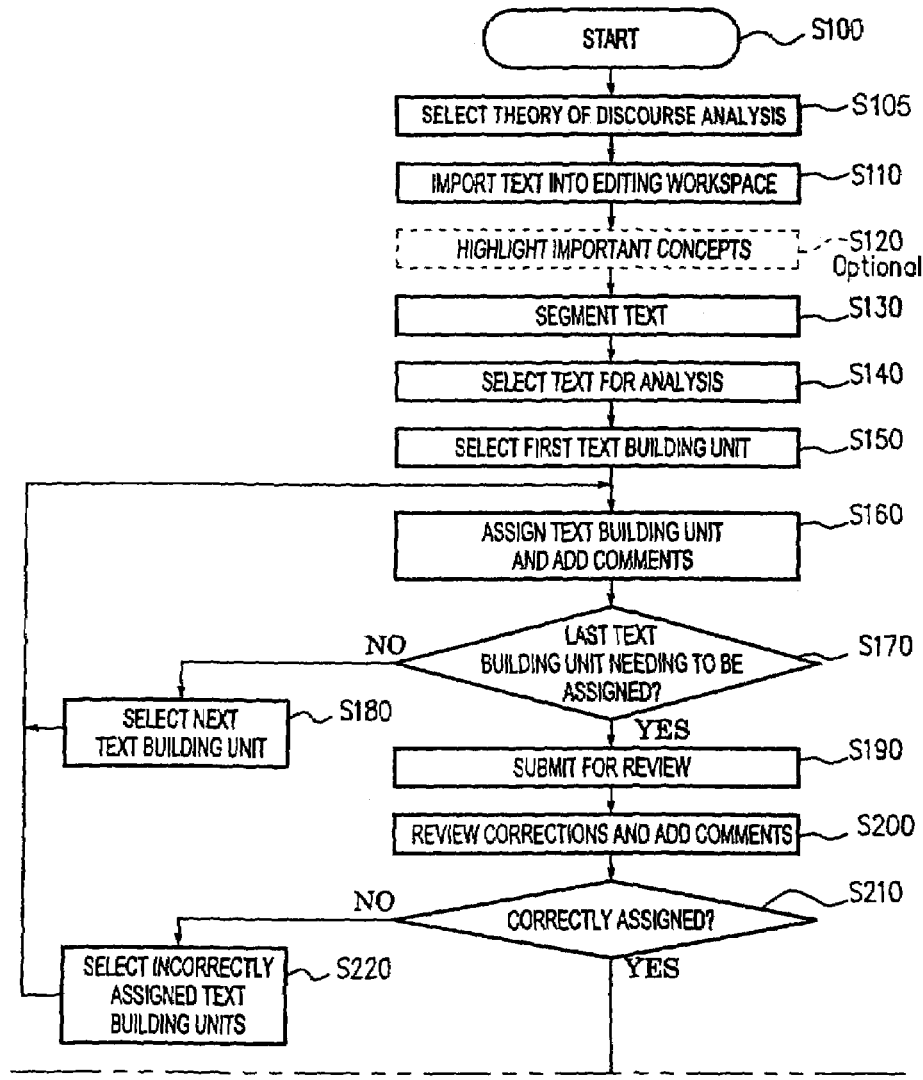
FIG. 2 shows an exemplary flowchart of the invention.
Figure 2B:
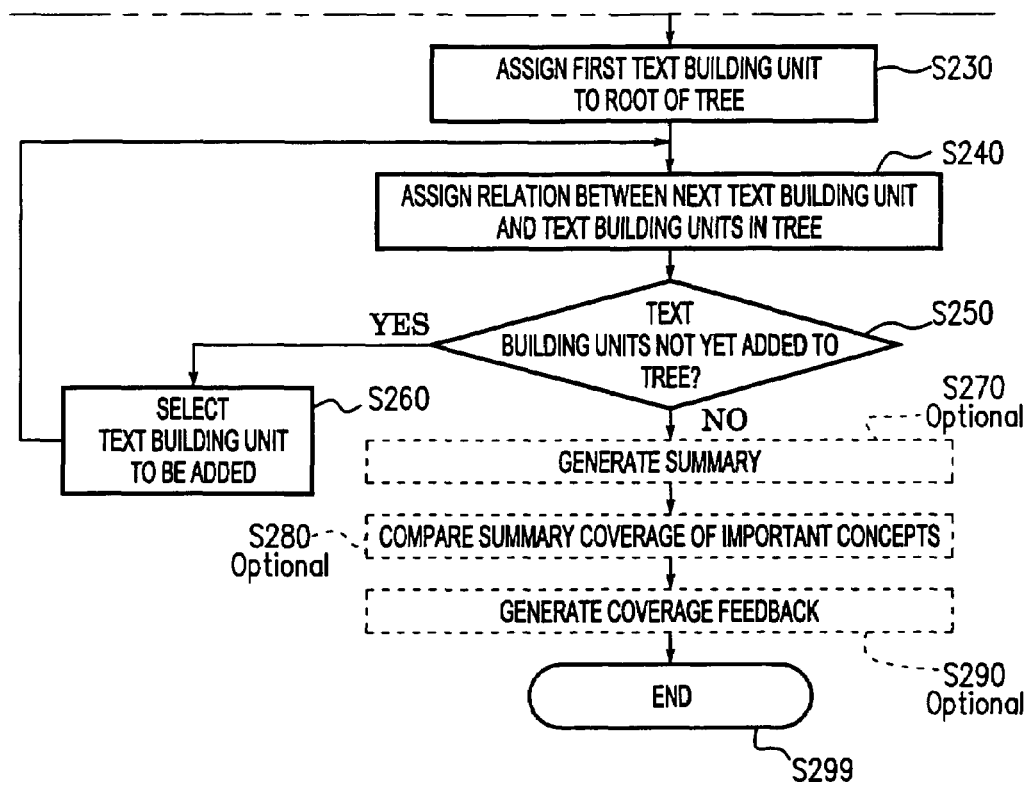

FIG. 2 is a flowchart outlining one exemplary embodiment of a method for analyzing a written text according to this invention. Beginning in step S100, control continues to step S105, where the user selects a particular theory of discourse analysis. As discussed above, such theories include, but are not limited to the Linguistic Discourse Model, Discourse Structures Theory, the Rhetorical Structure Theory, the Systemic Functional Grammar and Tagmemics. For ease of explanation this exemplary embodiment assumes that the Linguistic Discourse Model has been selected. Next, in step 110, the user may import a text into a text editing workspace. It will be apparent that the text may be entered directly into the system or the text may be entered into the system using any other method including text recognition of a printed or handwritten text, a voice entry system, a word processor such as EMACS, the UNIX editor vi, a wordprocessor such as Microsoft Corporation's Word® or any other known or later developed method or technique. The user may further edit a previously created text or may use the text editing workspace to generate new text for analysis.

Next, in optional step S120, portions of the text that convey important concepts may be highlighted or tagged. This may be accomplished by selecting relevant portions of the text and designating the selected portions of the text as important by using a drop down menu or a property dialog box, or by including tags such as XML (Extensible Markup Language) tags to delimit the important conceptual information. The important concepts may also be designated in a separate step through direct input of the relevant phrases found in the text into pop-up dialog box fields. It should also be appreciated that step S120 may be skipped. In this case, control jumps directly from step S110 to step S130.

Once the text has been entered, control continues to step S130 where the user is prompted to segment the written text into discrete text building units. As discussed above, text building units are the smallest unit of meaning in the text. A sentence may include a single text building unit or may include a number of text building units.

In various exemplary embodiments of the methods according to this invention, in step S130, the user divides the text into the discrete text building units by inserting a line break so that each text building unit appears on a separate line. It will be apparent that alternate methods of segmenting the text into text building units is possible. For example, in various other exemplary embodiments, the text is divided into text building units by bounding each text building unit within the text by a selected XML tag or the like.

Next, in S140, the user designates the portion of the text that is to be analyzed. For example, a user may only wish to analyze a problematic paragraph rather than an entire text. This would occur, for example when the user had already analyzed the text one or more times and merely wanted to review the effects that changes made to the revised paragraph have on the resulting discourse tree. Usually, however, the entire text will be selected for analysis. Control then continues to step S150.

It will be apparent that, in various exemplary embodiments, one or more of the steps may be accomplished under programmatic control. For example, for a given user, an individualized lesson plan can be presented and constantly monitored and updated, and a specific text or portion of the text can be selected for analysis to address specific pedagogical requirements of the student.

In step S150, a first text building unit is selected. Then, in step S160, a text building unit type is assigned to the selected text building unit using the implemented discourse theory. As discussed above, in various exemplary embodiments, the Linguistic Discourse Model is the implemented theory of discourse. Comments may also be added, in step S160, to the analysis of each text building unit as it is assigned. These comments may serve as temporary notes to the user, may indicate partial completion, and/or serve to communicate problem areas or pose questions to the reviewer. Next, in step S170, a determination is made whether the last text building unit has been assigned a text building unit type. If the current text building unit is not the last one control continues to step S180. Otherwise control jumps to step S190.

In step S180 the next unassigned text building unit is selected. Control then returns to step S160 and the loop continues until the last text building unit needing to be assigned has been processed. Control then jumps to step S190.

In step S190, once the user has assigned a text building unit type to each of the text building units according to the relevant theory of discourse, the work is saved to memory. Next, in step S200, the text submitted by the user and opened in the analysis workspace includes the fields seen by the user including text building unit, type and user comments fields. However, the analysis workspace now also includes one or more fields for the reviewer's comments. Any queries may be answered by placing an appropriate response in a corresponding one or more reviewer comment fields.

Then, in step S210, a determination is made whether any text building units have been assigned. If any text building units have been inappropriately assigned, control continues to step S220. In step S220, the text building units are selected. Control then jumps back to step S140. Otherwise control jumps to step S230.

In step S230, a discourse tree is begun by inserting a node representing a first text building unit as the root node of the discourse tree. As discussed above, the Linguistic Discourse Model implemented in various exemplary embodiments provides three relationships between the text building units: 1) coordinations; 2) subordinations; and 3) binaries.

In step S240, relationships are defined between the text building units already in the tree and succeeding text building units. The relationships define a new node that is inserted into the tree. The related text building units form child nodes of the tree.

Next, in step S250, a determination is made whether all text building units have been added to the discourse tree. If text building units remain to be added control continues to step S260. In step S260, the next building unit to be added is selected. Control then jumps back to step S240. Otherwise, once all text building units have been assigned, control jumps to optional step S270.

Figure 3:
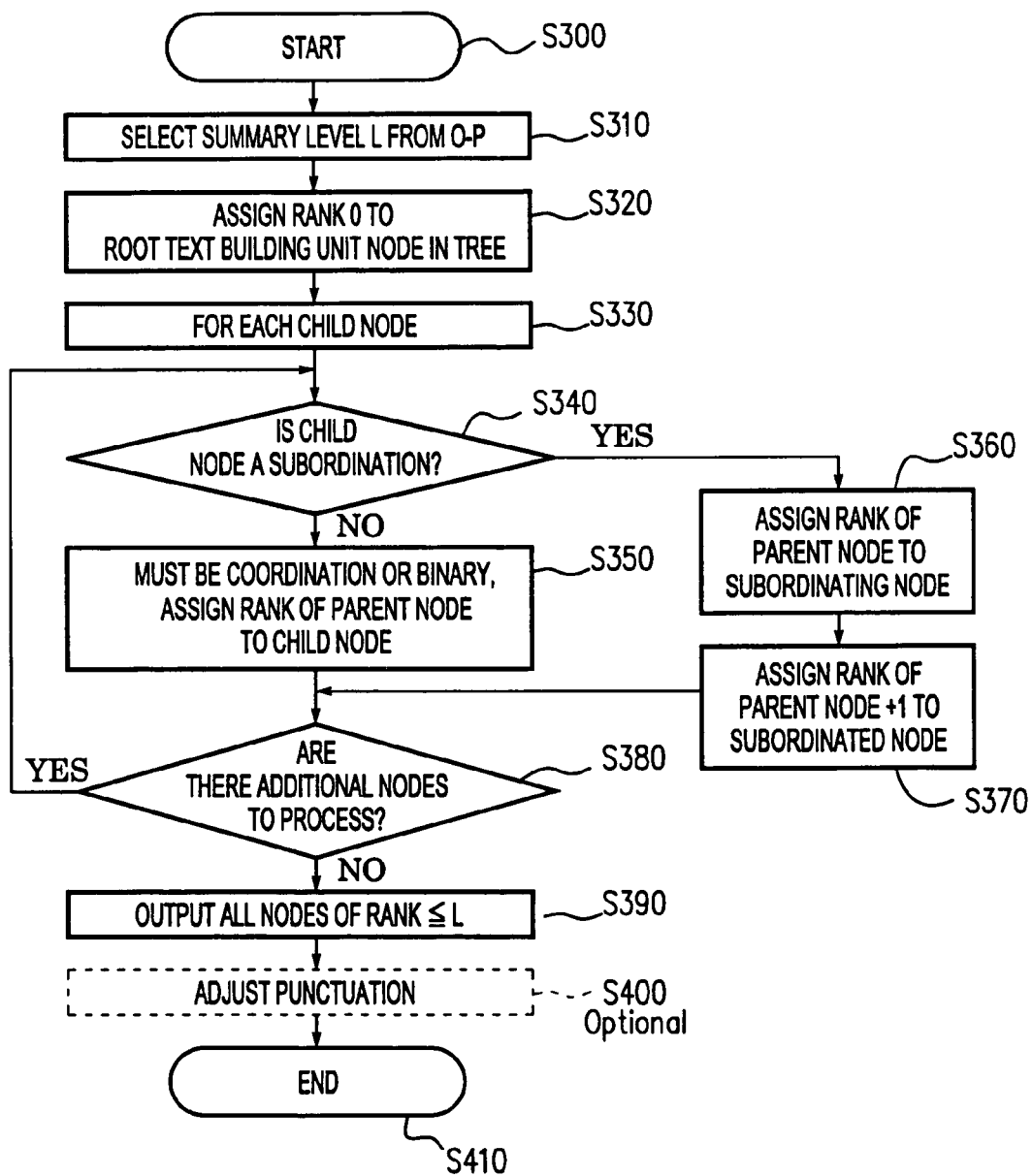
FIG. 3 shows an exemplary flowchart of the summary algorithm.

In step S270, a summary is created based on summary generation algorithms for the writing culture under analysis such as shown in FIG. 3 and discussed below.

On return, control then continues with optional step S280 where the automatically generated summary can be compared with the concepts previously designated by the user as important. By comparing coverage of user designated important concepts to the automatically generated summary, the user is provided objective feedback as to how well the text has conveyed the desired information.

Control is then transferred to optional step S290 where the measure of coverage is displayed. It will be apparent that different automatic measures of coverage can be used. For example, displaying the number of words from the important concepts that also appear in the automatically generated summary as a percentage number gives the user a quick indication of coverage. Similarly, for example, displaying in a different color, the words found in the important concepts but not found in the automatically generated summary gives users a quick indication of coverage corresponding to the amount of the colored text displayed. It will be apparent that any indication of coverage can be used in the invention.

The objective, reader centric microanalysis of the information conveyed in the written work can be easily compared to the information hoped to be conveyed to the target reader. Control is then transferred to step S299 and the process ends.

FIG. 3 shows an exemplary flowchart of summary generation. Various exemplary embodiments of the expository writing teaching system and method according to this inventions are designed for an English-language expository writing culture. It will be apparent that different languages and genres will be summarized using different summary algorithms. These different summary algorithms can be determined by analyzing the structure of the discourse tree created by the writing culture and identifying the text building units of importance.

Thus, many implementations of the summary generating technique according to this invention for different writing cultures will be apparent. For example, the summary generator specific to the English Expository writing culture is built upon the English expository convention that calls for the most salient information to be encoded in text units that are structurally dominant in a text.

In the English Expository writing culture, information that gives more detail about a point is conventionally encoded in a text unit that is embedded or subordinated to the more general, more salient information that it elaborates upon. In other writing cultures, different strategies will be used. The most salient information in a document or a passage may be presented at the end of the text, summing up or concluding as it were, what was said before.

In a text microanalysis using the Linguistic Discourse Model, the characteristic deployment of more or less salient information can be determined and a summarization generator devised that extracts information marked as more salient by its structural placement and encoding form before extracting information marked as less salient. Thus, it will be apparent how summary generation may be adapted to create a summary for other languages or writing cultures.

The English fiction writing culture dictates the use of a different structure from the English expository writing culture. For instance, in English fiction, the ambiguities identified by the microanalysis process as potentially confusing in an English expository writing culture may be required in writing a murder mystery. In a murder mystery the ambiguity helps preserves the suspense built up in the text narrative.

The summary generation begins with step S300 of FIG. 3 which reflects an exemplary flowchart of English expository summary generation. It will be apparent that with the appropriate substitution of a summarization system tailored to the specific writing culture, any type of writing in any language may be taught with the methods and systems of the invention. Control is then transferred to step S310.

In step S310, the user enters L, the level of summary desired. The value of the summary level L ranges from a lowest level, for example 0, representing the most specific level to a highest level P, the most general level. The value of the most general level P reflects the maximal number of subordination levels in the discourse tree. The summary level may be specified for example, by a property selection, a pop-up dialog box, an option setting or any other method. Next, in step S320 where the first node in the tree is assigned the lowest rank, for example 0. Then, in step S330, the child nodes are recursively selected. Control continues to step S340. In step S340, a determination is made if the selected child node is a subordination. If the node is a subordination, control is transferred to step S360. Otherwise if the node is not a subordination, control is transferred to step S350. In contrast, step S360, the rank of the parent node is assigned to the subordinating node. Then in step S370, the rank of the parent node, incremented by 1, is assigned to the subordinated node. Control then continues to step S380.

In this case, the node must be either a coordination or a binary. In either case, in step S350, the selected child node is assigned the rank of the parent node. Control then jumps to step S380.

In step S380, a determination is made as to whether any child nodes remain to be processed. If child nodes remain to be processed, control is transferred to step S340 and the type determination and ranking steps are repeated for all remaining child nodes. When no child nodes remain to be processed, control is transferred to step S390.

In step S390, all nodes of rank less than or equal to the requested summary level L are selected and output. Next, in optional step S4000, the punctuation may be adjusted to create complete sentences. Then in step S410, control returns to step S280.

The exemplary embodiment describes the summarization in terms of the structural representation of a tree. Alternate theories of discourse that can be used in the expository writing teaching systems 200 may provide different structural representations of the text. However, any representational structure in which the salient information can be identified can be used.

Table 1 shows an example of a text segmented into text building units 1–6. The text building unit field contains the text building units as segmented by a user. In the exemplary embodiment, after text segmentation and prior to the text building unit type assignment, only the text building unit, type and user comments fields will be visible, since these are the fields used to make the assignments and interact with the reviewer or reviewing system.

When the type assignment is complete and the reviewer opens the file, the reviewer comments field is also exposed for view. When the review is complete and the corrected work submitted, the user may then view and interact with the relation and node fields which are used to link the text building units into the discourse tree.

The type field illustrates the assignment of text building unit type for the entry "He walked into the kitchen." This is a content text building unit. In various exemplary embodiments, the type assignment is entered by positioning the cursor in the cell and clicking the mouse. A constrained drop down selection list appears from which the content, modifier or operator type assignment may be selected. Once all the text building unit type assignments have been made, the file is submitted for review as described above.

After correction and further review as necessary, the text building units can be inserted into the structural representation of the discourse. For each successive text building unit, the user may specify a relationship in the relation field between the next text building unit and text building units that serve as the insertion points in the discourse tree. Using the constructed relation nodes discussed above, and the node field, the next text building unit may be easily inserted into the discourse tree by providing the user with a drop down list of potential insertion points for the next text building unit. In some cases a subsequent text building unit may extend the activity carried out by text building units already related to one another on the discourse tree as siblings. In this case, the incoming text building unit will be added under the existing node as a next sibling.

FIG. 4 shows an exemplary discourse tree for the exemplary list of text building units shown in Table 1. The tree also includes the ranks of each node generated by summarizing according to the English expository writing culture. The first text building unit is linked to the second text building unit by a coordination node labeled 1–6. As a result each of the text building units is assigned 0, the rank of the parent node. The subordinating node, "He apologized to his

TABLE 1

| Field # | 410 Text Building Unit | 420 Type | 430 Relation | 440 Node | 450 User Comments | 460 Reviewer Comments |
|---|---|---|---|---|---|---|
| 1 | John came in through the back door | Content | | | | |
| 2 | He walked into the kitchen | Content | Coordination | Coordination, 1–6 | Is this a modifier? | |
| 3 | He apologized to his wife for being late | Content | Coordination | Coordination, 1–6 | | |
| 4 | He had to visit his mother | Content | Subordination | Subordination, 3–4 | Is this a binary? | |
| 5 | His mother likes him to come by | Content | Subordination | Subordination, 4–5 | Is this a coordination? | No, it is a subordination. |
| 6 | His wife said she didn't mind | Content | Coordination | Coordination, 1–6 | | | wife" inherits the rank of the parent node, which is the subordination node 3–4. However, the rank of the subordinated node, "He had to visit his mother" is assigned the rank of the parent node incremented by one. Similarly the rank of the subordinated node, "His mother likes him to come by" is incremented by two.

Thus, for a summary level of 0, summarizing the discourse tree produces, "John came in through the back door. He walked into the kitchen. He apologized to his wife for being late. His wife said she didn't mind." The summary would not display the subordinations since these text building units are ranked higher than the chosen summary level. In this way, the generated summary provides an indication as to what information the virtual reader would understand the text to convey. This feedback information may then be incorporated by the user into future revisions of the text.

While this invention has been described in conjunction with the specific embodiments outlined above, it is evident that many alternatives exist. For example, the expository writing system 200 may be used with classical Rhetorical Structures Theory of discourse analysis. The system allows for the segmenting of a text into the text building units of the Rhetorical Structures Theory or any other theory of discourse. In the Rhetorical Structures Theory the discourse is built up from nucleus and satellite units that reflect situations presented.

Relations defined between text building units in Rhetorical Structures Theory might rely on such classical Rhetorical Structures Theory relations as: circumstance; condition; elaboration; evaluation; interpretation; means; non-volitional cause; non-volitional result; otherwise; purpose; solutionhood; unconditional; unless; volitional cause and volitional result as subject matter relations. Presentational relations in classical Rhetorical Structures Theory include: antithesis; background; concession; enablement; evidence; justify; motivation; preparation; restatement; and summary.

The analytic process of building the structural representation of discourse using any theory of discourse allows the user to understand their text as viewed through that analytic framework. Thus, the system and methods may be adapted to Systemic Functional Grammar, Tagmemics or any other known or later developed theory of discourse analysis to teach a user how to write using these theories of discourse analysis.

It should be understood that the expository writing teaching system 200 can be implemented on a programmed general purpose computer. However, the expository writing teaching system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2 and 3 may be used to implement the expository writing teaching system 200.

It will be apparent that the processing circuits or routines of expository writing teaching system 200 may be used in collaborative networked learning environments in which some or all of the expository writing teaching system 200 components including the circuits or routines may be distributed throughout the network collaborative environment or located centrally. The environment may include web servers, application servers, or any other type of computer system. In general, the system may be used alone or in combination with any number of other general programmable or special purpose computers or components and in any type of environment including networked collaborative learning environments, client server environments and web based environments.

Modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for teaching expository writing, comprising:
   selecting a theory of discourse analysis for teaching writing;
   segmenting a text into at least one text building units based on the selected theory of discourse;
   analyzing each text building unit according to the selected theory of discourse;
   wherein the selected theory of discourse analysis is selected from the list of at least Discourse Structures Theory, Linguistic Discourse Model, Rhetorical Structure Theory, Systemic Functional Grammar, and Tagmemics.

2. The method of claim 1, wherein the at least one text building units are combined into a structural representation of discourse consistent with the selected theory of discourse.

3. The method of claim 1, wherein the structural representation of discourse is a tree, and wherein the segmenting is performed automatically, and the structural representation is displayed.

4. The method of claim 1, further comprising displaying the segmented text.

5. The method of claim 1, further comprising displaying the analyzed text.

6. The method of claim 2, further comprising displaying the structural representation of discourse.

7. The method of claim 1, further comprising identifying user designated important concepts in the text.

8. The method of claim 1, further comprising generating a summary of text based on the selected theory of discourse.

9. The method of claim 8, further comprising determining coverage of user designated important concepts.

10. The method of claim 9, wherein determining coverage compares user designated concepts to the summary.

11. The method of claim 8, wherein summary generation comprises the following steps:
    identifying the root node and assigning it a rank; and
    recursively selecting each remaining child node;
        for each child node that is a coordination node or a binary node assigning the child node the rank of the parent; and
        for each child node that is a subordination node;
            assigning to the subordinating node, the rank of the parent; and
            assigning to the subordinated node, the rank of the parent incremented by 1.

12. The method of claim 8, wherein a summary is displayed by:
    selecting a summary level p for a structural representation of discourse having a lowest level m and a highest level n so that $m \leq p \leq n$;
    walking the nodes of the tree in order of insertion up to the level p; and
    displaying the nodes traversed.

13. The method of claim 1, wherein the segmenting is performed automatically.

14. The method of claim 1, wherein the analysis is performed automatically.

15. A system for teaching expository writing, comprising:
an input device;
a display device;
a memory;
a segmenting circuit;
an analyzing circuit; and
a controller that selects a theory of discourse from the input device, segments a text received form the memory to create at least one text building unit according to the selected theory of discourse, analyzes the at least one text building unit according to the selected theory of discourse and displays the text building units;
wherein the selected theory of discourse analysis is selected from the list of at least Discourse Structures Theory, Linguistic Discourse Model, Rhetorical Structure Theory, Systemic Functional Grammar, and Tagmemics.

16. The system of claim 15, further comprising a reviewing circuit that reviews the analyzed text building units for consistency with the selected theory of discourse.

17. The system of claim 15, further comprising a structural representation building circuit to create a structural representation of the text building units according to the selected theory of discourse.

18. The system of claim 17, wherein the structural representation is a tree structure.

19. The system of claim 15, further comprising a concept highlighting circuit to highlight user designated important concepts.

20. The system of claim 15, further comprising a summary generating circuit that generates a summary based on the selected theory of discourse.

21. The system of claim 20, wherein the summary generating circuit identifies the root node and assigns it a rank; recursively selects each remaining child node and for each child node that is a coordination node or a binary node, assigns each remaining child node the rank of the parent; and for each child node that is a subordination node, assigns the rank of the parent to the subordinating node and the rank of the parent+1 to the subordinated node.

22. The system of claim 20, further comprising a concept comparator circuit.

23. The system of claim 22, wherein the concept comparator circuit provides a ratio of words from the user designated important concepts that are identified in the summary.

24. A method for teaching expository writing, comprising:
segmenting a text into at least one text building units based on the Linguistic Discourse Model theory of discourse;
analyzing each text building unit according to the Linguistic Discourse Model theory of discourse; and
providing, based on the analyzed at least one text building units, objective feedback for teaching expository writing.

25. A system for teaching expository writing, comprising:
an input device;
a display device;
a memory;
a segmenting circuit;
an analyzing circuit; and
a controller that segments a text received form the memory to create at least one text building unit according to the Linguistic Discourse Model theory of discourse, analyzes the at least one text building unit according to the Linguistic Discourse Model theory of discourse, displays the text building units, and provides, based on the analyzed at least one text building units, objective feedback for teaching expository writing.

* * * * *